(12) United States Patent
Harmer

(10) Patent No.: US 7,719,787 B2
(45) Date of Patent: May 18, 2010

(54) PHASE LOCKED ANTI- NOTCH FILTER IN A SERVO CONTROL LOOP

(75) Inventor: Brent Jay Harmer, Johnstown, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 43 days.

(21) Appl. No.: 12/040,018

(22) Filed: Feb. 29, 2008

(65) Prior Publication Data

US 2009/0219641 A1    Sep. 3, 2009

(51) Int. Cl.
G11B 5/596 (2006.01)
G11B 21/02 (2006.01)

(52) U.S. Cl. .................... 360/77.02; 360/75
(58) Field of Classification Search .............. None
See application file for complete search history.

(56) References Cited

U.S. PATENT DOCUMENTS

| | | | |
|---|---|---|---|
| 3,241,077 A * | 3/1966 | Smyth et al. | 327/5 |
| 5,072,318 A | 12/1991 | Yu | |
| 5,550,685 A * | 8/1996 | Drouin | 360/77.08 |
| 5,608,586 A | 3/1997 | Sri-Jayantha et al. | |
| 6,421,198 B1 | 7/2002 | Lamberts et al. | |
| 6,628,472 B1 | 9/2003 | Ho | |
| 6,636,376 B1 | 10/2003 | Ho | |
| 6,768,607 B2 * | 7/2004 | Ottesen et al. | 360/77.02 |
| 7,319,570 B2 * | 1/2008 | Jia et al. | 360/77.02 |
| 7,486,470 B1 * | 2/2009 | Semba | 360/77.01 |
| 2005/0243458 A1 * | 11/2005 | Iwashiro | 360/77.02 |

* cited by examiner

*Primary Examiner*—Andrew L Sniezek
(74) *Attorney, Agent, or Firm*—David K. Lucente

(57) ABSTRACT

An anti-notch filter in a servo control loop is phase locked to a nonrepeatable runout component of a servo control loop signal. The phase locked anti-notch filter may thereby more effectively track time varying characteristics of the nonrepeatable runout component so that they can be at least partially reduced in the servo control loop signal.

20 Claims, 6 Drawing Sheets

PHASE LOCKED ANTI- NOTCH FILTER IN A SERVO CONTROL LOOP

BACKGROUND

The present invention generally relates to controlling transducer movement and, more particularly, to controlling transducer movement responsive to a position error signal within a servo control loop.

A typical data storage disk drive includes a plurality of magnetic recording disks which are mounted to a rotatable hub of a spindle motor and rotated at a high speed. An array of read/write heads is disposed adjacent to surfaces of the disks to transfer data between the disks and a host device. The heads can be radially positioned over the disks by a rotary actuator and a closed loop servo system.

The servo system can operate in two primary modes: seeking and track following. During a seek, a selected head is moved from an initial track to a target track on the corresponding disk surface. Upon reaching the target track, the servo system enters the track following mode wherein the head is maintained over the center of the target track while data is written/read. During track following, prerecorded servo information sensed by the head is demodulated to generate a position error signal (PES), which provides an indication of the position error of the head away from the track center. The PES is then converted into an actuator control signal, which is fed back to an actuator to position the head.

In general, there are two forms of head positioning errors: repeatable and non-repeatable. Repeatable errors, which are generally caused by mechanical irregularities in the structure of the disc drive or errors introduced when writing the servo tracks, can be predicted and therefore theoretically can be cancelled out as they occur. In general, these repeatable runout errors (RRO) are removed by introducing a compensation signal into the servo loop that cancels the repeatable positioning error. Techniques for generating such compensation signals are generally referred to as feedforward cancellation.

Nonrepeatable runout (NRRO) disturbances can arise as a result of a variety of factors and the characteristics of the disturbance often vary depending on the source of the disturbance. Disc flutter disturbances have high energy concentrated at specific frequencies. Suspension windage-induced disturbances occur at higher frequencies and have wider bandwidths. Also, unlike RRO errors, NRRO errors do not occur with predictable magnitudes or frequencies. Moreover, the magnitude and frequency of NRRO error generally changes over time.

SUMMARY

An anti-notch filter in a servo control loop is phase locked to a nonrepeatable runout component of a servo control loop signal. The phase locked anti-notch notch filter may thereby more effectively track time varying characteristics of the non-repeatable runout component so that they can be at least partially reduced in the servo control loop signal.

In some embodiments, an anti-notch filter filters the servo control loop signal to generate a filtered signal. The anti-notch filter has a notch frequency that is tuned in response to phase differences between the servo control loop signal and the filtered signal.

In some other embodiments, a servo control loop signal is filtered using an anti-notch filter to generate a filtered signal. A notch frequency of the anti-notch filtering is tuned in response to phase differences between the servo loop control signal and the filtered signal.

In yet some other embodiments, a servo controller includes a high-Q anti-notch filter, a phase detector circuit, and an actuator controller. The high-Q anti-notch filter has an underdamped gain response and filters a servo control loop signal to generate a filtered signal. The phase detector circuit generates a phase error signal in response to multiplication of the servo control loop signal and the filtered signal. A notch frequency of the notch filter is tuned in response to the phase error signal which corresponds to a resonant frequency of a non-repeatable runout component of the servo control loop signal. An actuator controller controls positioning of a transducer in response to the filtered signal

DETAILED DESCRIPTION

Figure 1:
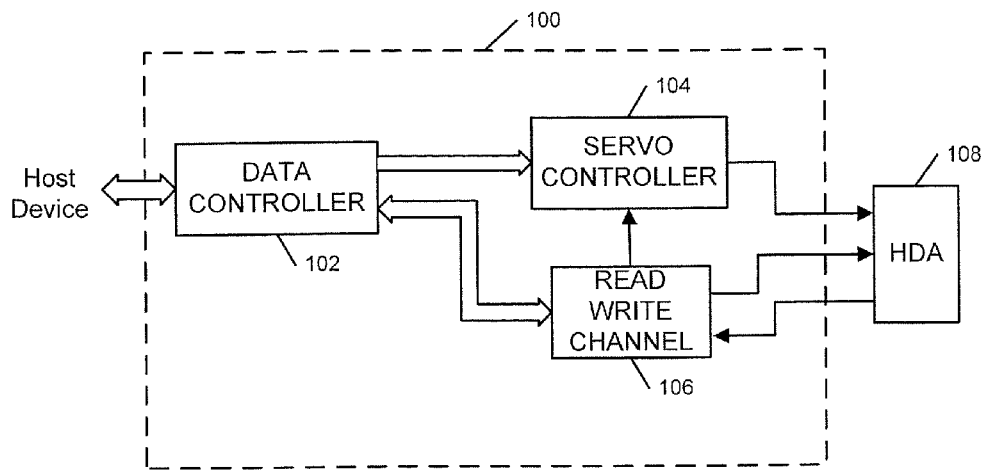
FIG. 1 is a block diagram of disk drive electronic circuits that include a servo controller that is configured in accordance with some embodiments.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that can be subject to NRRO.

As will be described further below, NRRO disturbances may be reduced in a servo control loop at lower frequencies (below the gain crossover) by increasing localized loop gain. NRRO disturbances may be reduced at higher frequencies (approaching the gain crossover) by increasing localized phase margin. These two approaches will be referred to hereafter as Gain Boost and Phase Boost, respectively. Adding localized gain boost or phase boost to the open loop response of a servo system may produce notch functions in the closed loop response and which is referred to herein as an anti-notch.

FIG. 1 is a block diagram of disk drive electronic circuits 100 which include a data controller 102, a servo controller 104, and a read write channel 106. Although two separate controllers 102 and 104 and a read write channel 106 have been shown for purposes of illustration and discussion, it is to be understood that their functionality described herein may be integrated within a common integrated circuit package or distributed among more than one integrated circuit package. A head disk assembly (HDA) 108 can include a plurality of data storage disks, an actuator with a plurality of heads which are moved radially across different data storage surfaces of the disks by a servo motor (e.g., voice coil motor), and a spindle motor which rotates the disks.

Write commands and associated data from a host device are buffered by the data controller 102. The host device can include, but is not limited to, a desktop computer, a laptop computer, a personal digital assistant (PDA), a digital video recorder/player, a digital music recorder/player, and/or another electronic device that can be communicatively coupled to store and retrieve data in the HDA 108. The data controller 102 carries out buffered write commands by formatting the associated data into blocks with the appropriate header information, and transfers the formatted data via the read/write channel 106 to logical block addresses (LBAs) on a disk in the HDA 108 identified by the associated write command.

The read write channel 106 can convert data between the digital signals processed by the data controller 102 and the analog signals conducted through the heads in the HDA 108. The read write channel 106 provides servo data read from the HDA 108 to the servo controller 104. The servo data can be used to detect the location of the head in relation to LBAs on the disk. The servo controller 104 can use LBAs from the data controller 102 and the servo data to seek the head to an addressed track and block on the disk (i.e., seek mode), and to maintain the head aligned with the track while data is written/read on the disk (i.e., track following mode).

In accordance with some embodiments, the servo controller 104 is configured to at least partially cancel effects of NRRO on head positioning during the track following mode.

Figure 2:
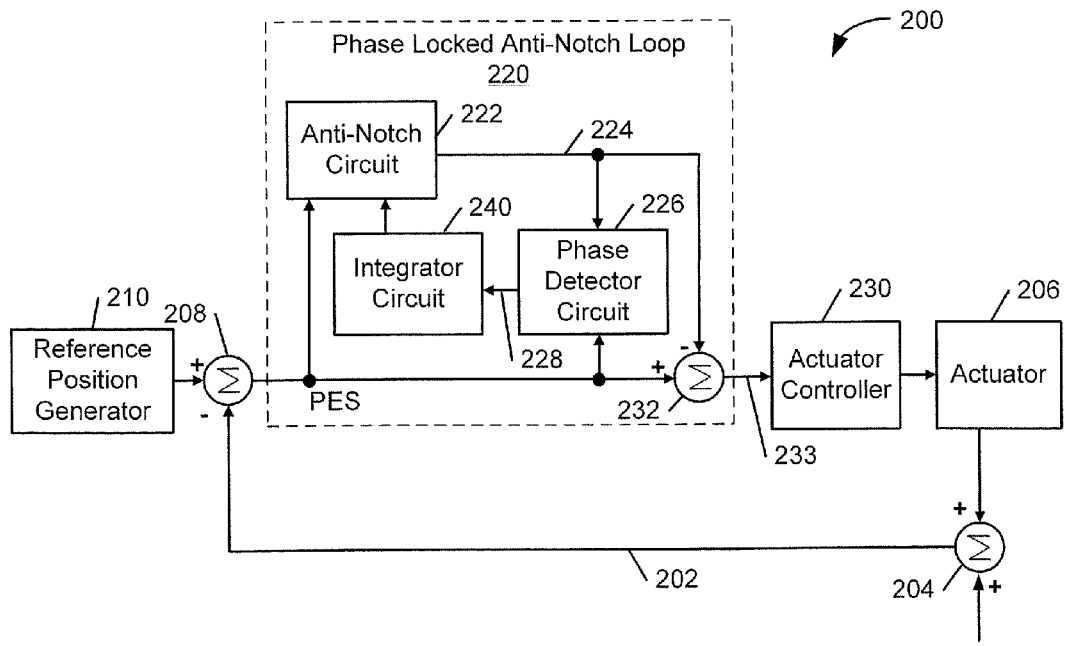
FIG. 2 is a further block diagram of a servo control loop within the servo controller of FIG. 1 in accordance with some embodiments.

FIG. 2 is a further block diagram of a servo control loop 200 within the servo controller 104 of FIG. 1 in accordance with some embodiments. During a track following operation, a read position signal 202 is generated by a head as servo patterns are read along a track, where the read position signal 202 indicates radial position of the head relative to the track, such as relative to servo information within servo sectors. The position of the head is affected by the combined contributions, illustrated by summing node 204, of positioning by an actuator 206 and NRRO disturbances on the head, such as from external shock, disk flutter, and/or windage effects on the actuator/head. Accordingly, the read position signal 202 includes a NRRO disturbance component therein.

The read position signal 202 is fed-back to a summing node 208, where it is combined with a reference position signal from the reference position generator 210 to generate a position error signal (PES). The reference position signal from the reference position generator 210 indicates a desired radial position of the head, and may be a DC value (e.g., static value) for at least a portion of the revolution of the disk. The reference position generator 210 can be configured to drive a head toward the centerline of the track during track following, or to move the head off-track during seeking.

A phase locked anti-notch loop 220 filters the position error signal to generate phase and/or gain boost anti-notch filtered PES 233 which, when added to the loop, reduces the NRRO component of the PES. An actuator controller 230 responds to the anti-notch filtered PES 233 to generate an analog actuator control signal that controls radial movement of the head(s) across the disk(s) by the actuator 206.

The phase locked anti-notch loop 220 includes a high-Q filter circuit 222 that provides a lowpass filtered PES 224, which, when subtracted from the PES by a summing circuit 232, produces a phase boost anti-notch filtered PES 233. The phase locked anti-notch loop 220 has a notch frequency that is tuned in response to phase differences between the PES and the lowpass filtered PES 224. More particularly, a phase detector 226 generates a phase error signal 228 that indicates a phase difference between the lowpass filtered PES 224 and the PES. An integrator circuit 240 integrates the phase error signal 228 to generate a notch frequency tuning signal that drives the notch frequency of the anti-notch filter circuit 222 toward a resonant frequency of the NRRO. A cancellation summing circuit 232 subtracts the high-Q filtered PES 224 from the PES to at least partially cancel the NRRO component of the PES and generate therefrom the anti-notch filtered PES 233 that is provided to the actuator controller 230.

The phase detector circuit 226 may generate the phase error signal 228 by multiplying the PES and the filtered PES 224. Multiplication of the two signals can be represented by the following Equation 1:

$$A\sin(\omega_0 t) \cdot B\sin(\omega_0 t + \phi_e) = \frac{AB}{2}\cos(\phi_e) - \frac{AB}{2}\cos(2\omega_0 t + \phi_e) \quad \text{(Equation 1)}$$

In Equation 1, the term "A" refers to amplitude of the PES, the term "B" refers to amplitude of the filtered PES 224, the term "$\omega_0$" refers to frequency of the two signals, and the term "$\phi_e$" refers to a phase difference between the two signals.

Because the multiplied signals are both sine waves of the same frequency, their multiplication results in two components: 1) an AC component at twice the sine-frequency of the multiplied signals (i.e., $$\frac{AB}{2}\cos(2\omega_0 t + \phi_e));$$

and 2) a DC component that is proportional to the phase error between the two multiplied signals (i.e., $$\frac{AB}{2}\cos(\phi_e)).$$

The DC component is zero when the phase difference between the two signals it's 90 degrees.

Figure 3:
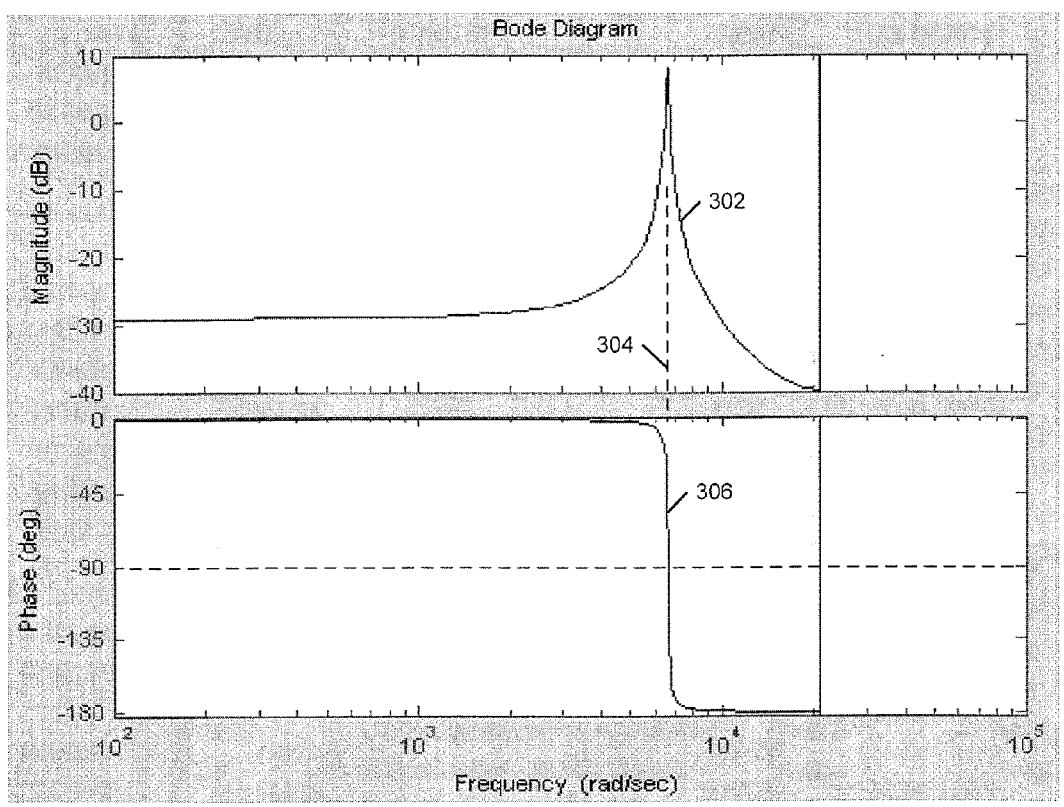
FIG. 3 is a Bode diagram illustrating exemplary characteristics of a high-Q low pass filter having a notch frequency that is tuned responsive to phase differences between a position error signal and a notch filtered position error signal.

The narrow bandwidth of the high-Q filter circuit 222 may be used to reject PES frequencies that are outside a region of interest (e.g., outside a frequency range that has a sufficient level of deleterious effects on head positioning). FIG. 3 is a Bode diagram illustrating exemplary characteristics of a high-Q low pass filter, within the high-Q filter circuit 222.

Referring to FIG. 3, the high-Q low pass filter exhibits an underdamped gain response as illustrated by its spiked output magnitude centered at a resonant frequency of the NRRO. The high-Q low pass filter outputs a signal having a 90 degree phase delay at the center resonant frequency of the NRRO. The output signal of the high-Q low pass filter has less than 90 degrees phase delay below the center frequency and greater than 90 degrees phase delay above the center frequency. Consequently, the high-Q low pass filter translates a frequency error into a phase error, which can then be detected by the phase detector circuit 226. When the cancellation summing node 232 subtracts the filtered PES 224 from the PES, a phase locked anti-notch function is produced which can at least partially cancel the NRRO component of the PES. The notch frequency tuning signal output by the integrator circuit 240 tunes the notch frequency of the high-Q low pass filter toward the resonant frequency of the NRRO, and thereby dynamically compensates for time-varying frequency characteristics of the NRRO.

As will be explained further below, the anti-notch circuit 222 may operate with a plurality of notch frequencies, each of which is tuned toward a different one of a plurality of resonant frequencies of the NRRO component of the PES. Each of the notch frequencies can be repetitively tuned, via the phase locked anti-notch loop, to a different one of a plurality of cyclically occurring ordered time samples of the PES.

Figure 4:
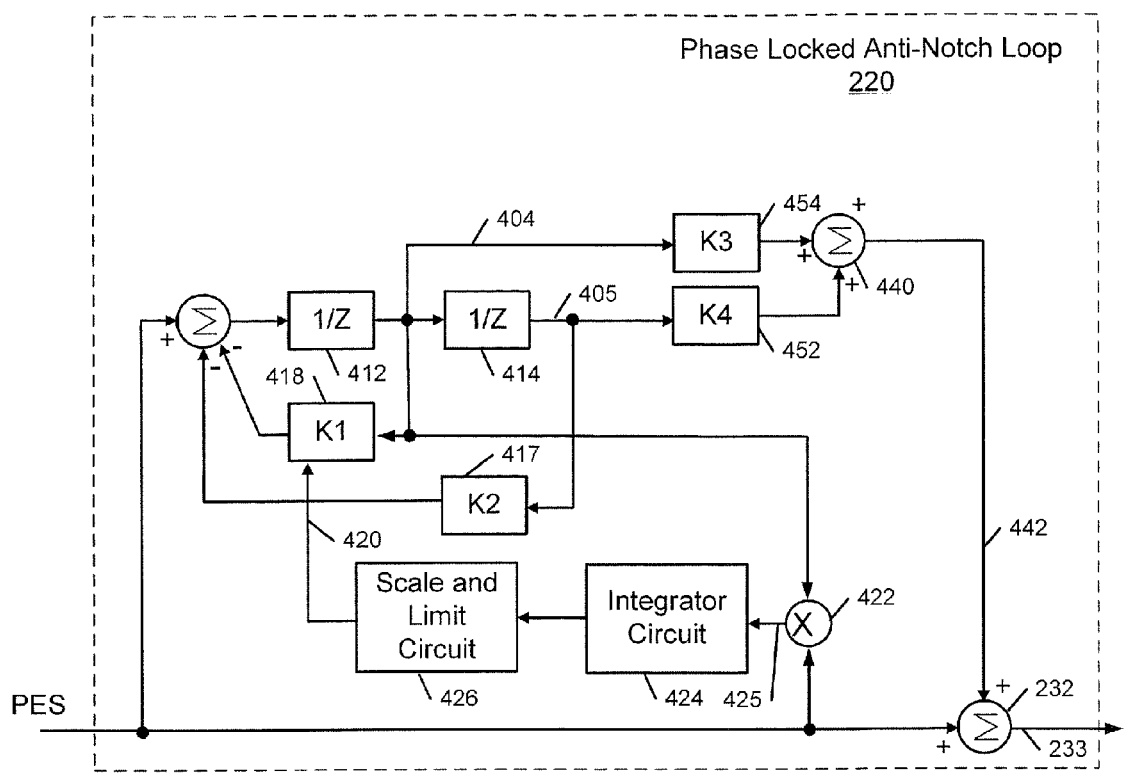
FIG. 4 is a further block diagram of an embodiment of the phase locked anti-notch loop of FIG. 2.

FIG. 4 is a further block diagram of an embodiment of the phase locked anti-notch loop of FIG. 2.

The second order high-Q Filter 222 includes two unit time delays, 412 and 414, and associated feedback gains, K1 (418) and K2 (417). The gain K2 can be varied to regulate the bandwidth of the second order high-Q Filter 222. The gain K1 controls the location of poles in the second order high-Q Filter 222.

To control the location of poles in the second order high-Q Filter 222, the controllable gain circuit 418 has a variable gain that is regulated in response to a tuning signal 420. As will be explained below, the tuning signal 420 is regulated so as to location of poles toward the resonant frequency of the NRRO, and to thereby dynamically compensate for time-varying frequency characteristics of the NRRO. For example, the location of poles can be tuned to the fundamental frequency of the NRRO component of the PES.

A first time-delayed signal 404 is obtained from the output of the first unit time delay 412. To detect the phase error between the first time-delayed signal 404 and the PES, a multiplication circuit 422 multiplies the signals to generate a phase error signal 425 having a DC component that, according to relationship of Equation 1, is proportional to the phase error between the two multiplied signals as shown by Equation 2 below:

$$DC\ component = 0.5*A*B*\cos(\phi_e). \qquad \text{(Equation 2)}$$

In Equation 2, "A" is the PES, "B" is the first time-delayed signal 404, and "$\phi_e$" is the phase error between the PES and the first time-delayed signal 404. For small phase error changes near 90 degrees, the gain can be approximated as the change in the DC component divided by change in the phase error, or about 0.5*A*B.

The phase error signal 425 output from the multiplication circuit 422 is integrated by an integrator circuit 424. The transfer function (H(Z)) of the integrator circuit 424 at sample time Z can be represented in the discrete-time domain by Equation 3 below:

$$H(z) = \frac{Z}{Z-1}. \qquad \text{(Equation 3)}$$

The integrated phase error signal is scaled and limited by circuit 426 to generate an adjusted integrated phase error signal 428. The integrated phase error signal is scaled to regulate how quickly the notch frequency of the high-Q low pass filter follows changes in the phase error. Too high of a scaling value can result in instability due to tuning of the notch frequency responsive to noise, while too low of a scaling value can result in sufficient compensation for transient variations in the NRRO.

The phase error signal may be integrated and scaled, via a functional combination of circuits 424 and 426, by bit shifting a digital value of the phase error signal from the multiplication circuit 422 by a defined number of bits positions to the left and then adding the resulting digital value to the 32-bit sum accumulated by the integrator circuit 424. For example, when the first time-delayed signal 404 is a 16-bit word and the PES is also a 16-bit word, the phase error signal 425 is a 32-bit word. The 32-bit word value of the integrated phase error signal can be scaled by shifting the word value a defined number Klearn bit positions to the left, and then adding the resulting value to an accumulated sum maintained by the integrator circuit 424. The high 16-bit portion of the scaled and integrated 32-bit word output from the circuit 426 can be used to define the gain K1 (418).

As explained above, the anti-notch circuit 222 may operate with a plurality of notch frequencies, each of which is tuned toward a different one of a plurality of resonant frequencies of the NRRO component of the PES. Each of the notch frequencies can be repetitively tuned, via the phase locked anti-notch loop, to a different one of a plurality of cyclically occurring ordered time samples of the PES. The scale and limit circuit 426 can be configured to regulate which one of the notch frequencies is tuned in response to which one of the cyclically occurring ordered time samples of the PES.

For example, when the high-Q low pass filter has four notch frequencies, the circuit 426 may sequentially and separately tune a first gain K1(1) toward a resonant frequency of the NRRO in a first PES sample(1), then tune a second gain K1(2) toward a resonant frequency of the NRRO in a second PES sample(2), then tune a third gain K1(3) toward a resonant frequency of the NRRO in a third PES sample(3), and then tune a fourth gain K1(4) toward a resonant frequency of the NRRO in a fourth PES sample(4). The circuit 426 then cycles back to sequentially tune the first, second, third, and fourth gains K1(1)...K1(4) in response to respective first through fourth PES samples in a next cycle.

The circuit 426 may be configured to control the frequency range of each notch of the high-Q low pass filter by regulating the gain K2 (417) so as to prevent overlap of the notch frequencies. Continuing the example above, each of the four notch frequencies can have a different bandwidth by associating a different gain K2 (e.g., K2(1), K2(2), K2(3), and K2(4)) with the corresponding first through fourth PES samples in the sample cycles. Likewise, unique filter states for each anti-notch are switched in at the appropriate time for the corresponding PES samples.

With further reference to FIG. 4, a second time-delayed signal 405 is obtained from the output of the second unit time delay 414. An adjustable gain K4 (452) is applied to scale the second time-delayed signal 405. Another adjustable gain K3 (454) is applied to scale the first time-delayed signal 404. A summing node sums the scaled second time-delayed signal 405 and the scaled first time-delayed signal 404 to generate a scaled anti-notch filtered signal 442. The cancellation summing node 232 adds the scaled anti-notch filtered signal 442 to the PES to produce a phase boosted and gain boosted anti-notch filtered PES 233, which is output to the actuator controller 230 (FIG. 2).

The transfer function from PES to the anti-notch filtered output 442 ("FilterOut") can be represented at a discrete time (Z) by the following Equation 4:

$$\frac{FilterOut}{PES}(Z) = \frac{K3*Z + K4}{Z^2 + K1*Z + K2}. \quad \text{(Equation 4)}$$

In Equation 4, the term "K1" is equal to $-2*\cos(2*\pi*f*T)$, "T" is a sample period (seconds) and "f" is a center frequency of the high-Q peak (Hz). The term "K2" is equal to $e^{(-2*\pi*BW*T)}$, where "BW" is the bandwidth of the high-Q peak (Hz). The term "K4" is a value that is selected so as to obtain a desired gain boost in the anti-notch transfer function.

Similarly, the transfer function from PES to the filtered PES 233 can be represented by the following equation 5:

$$\frac{FilterPES}{PES}(Z) = \frac{Z^2 + (K1 + K3)*Z + (K2 + K4)}{Z^2 + K1*Z + K2}. \quad \text{(Equation 5)}$$

A wide range of second order filter function are produced by the proper selection of K1, K2, K3, and K4. The gain boost anti-notch and phase boost anti-notch functions are particularly useful for NRRO reduction. In some embodiments, K2, K3, and K4 are maintained constant while K1 is varied in response to the tuning signal 420 (as NRRO frequency changes).

The gains K3 and K4 can be regulated to control the locations of zeros in the servo control loop response. Similarly, the gains K1 and K2 can be regulated to control the locations of poles in the servo control loop response.

In some other embodiments, K2 is maintained constant while K1, K3, and K4 are varied in response to the tuning signal 420. This, for example, may be done to improve the anti-notch filter frequency response over a wide range of frequencies. A gain boosted anti-notch response provides more effective cancellation of lower frequency NRRO excitations. Conversely, a phase boosted anti-notch response provides more effective cancellation of higher frequency NRRO excitations. A blended mix of gain boosted and phase boosted anti-notch response can be particularly suited for use at intermediate NRRO excitation frequencies. More particularly, because higher frequency NRRO content in the PES can be closer to the phase crossover, over reliance on the gain boosted anti-notch response may reduce the gain margin and result in instability, such as when higher frequency noise is present in the PES. Accordingly, the gain values K1, K2, K3, and K4 can be regulated to control the weighting between gain boosted and phase boosted anti-notch response in the phase boosted and gain boosted anti-notch filtered PES 233.

Figure 5A:
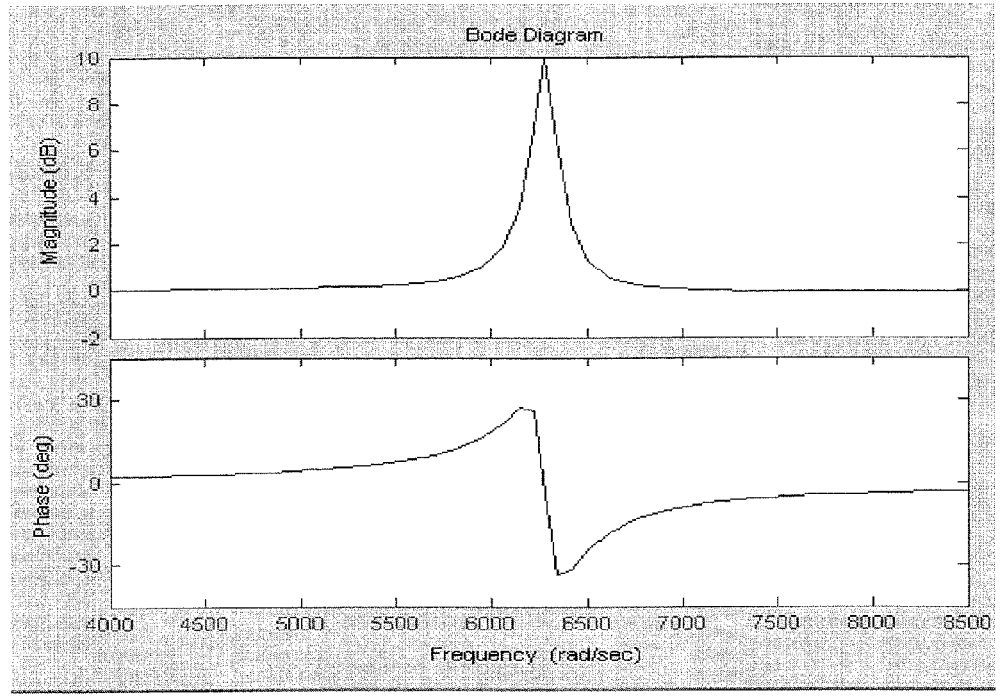
FIGS. 5A-B are Bode diagrams illustrating gain boost and phase boost anti-notch frequency response, respectively.

FIG. 5A is a Bode diagram that illustrates an exemplary gain boost anti-notch frequency response that may be generated by the anti-notch circuit 222. The transfer function can be represented by equation 4 above, where K1 is equal to $-1.942$, K2 is equal to 0.9963, K3 is equal to 0.0079, and K4 is equal to $-0.0079$, and a center frequency of the high-Q peak is at 26.88 kHz.

Figure 5B:
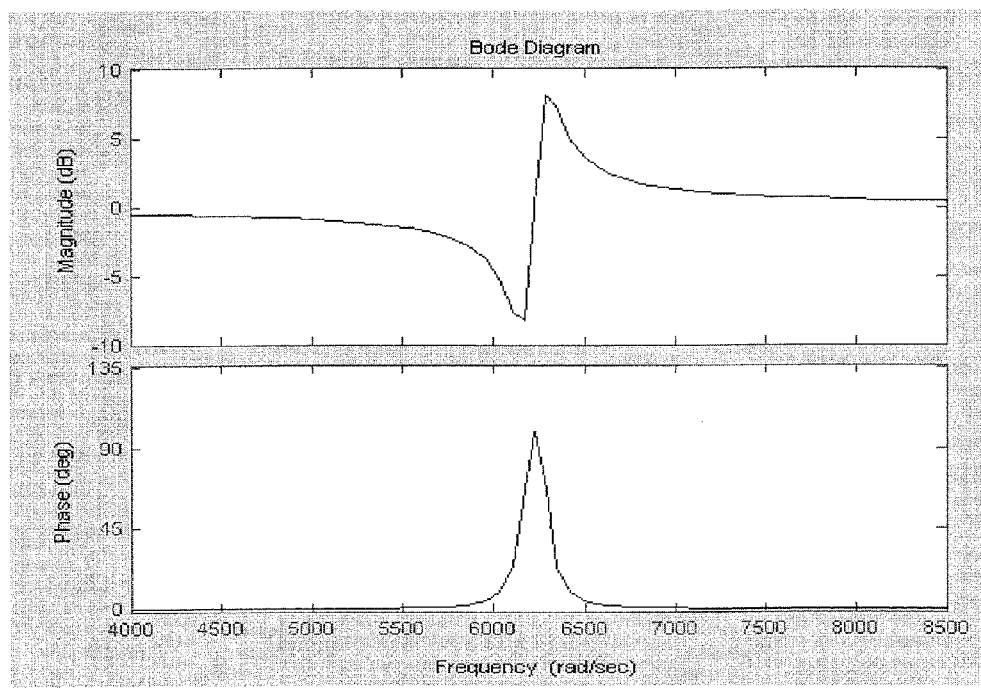

FIG. 5B is a Bode diagram that illustrates an exemplary phase boost anti-notch frequency response that may be generated by the anti-notch circuit 222. The transfer function can be represented by equation 4 above, where K1 is equal to $-1.942$, K2 is equal to 0.9963, K3 is equal to $-0.002$, and K4 is equal to 0, and a center frequency of the high-Q peak is at 26.88 kHz.

Figure 6:
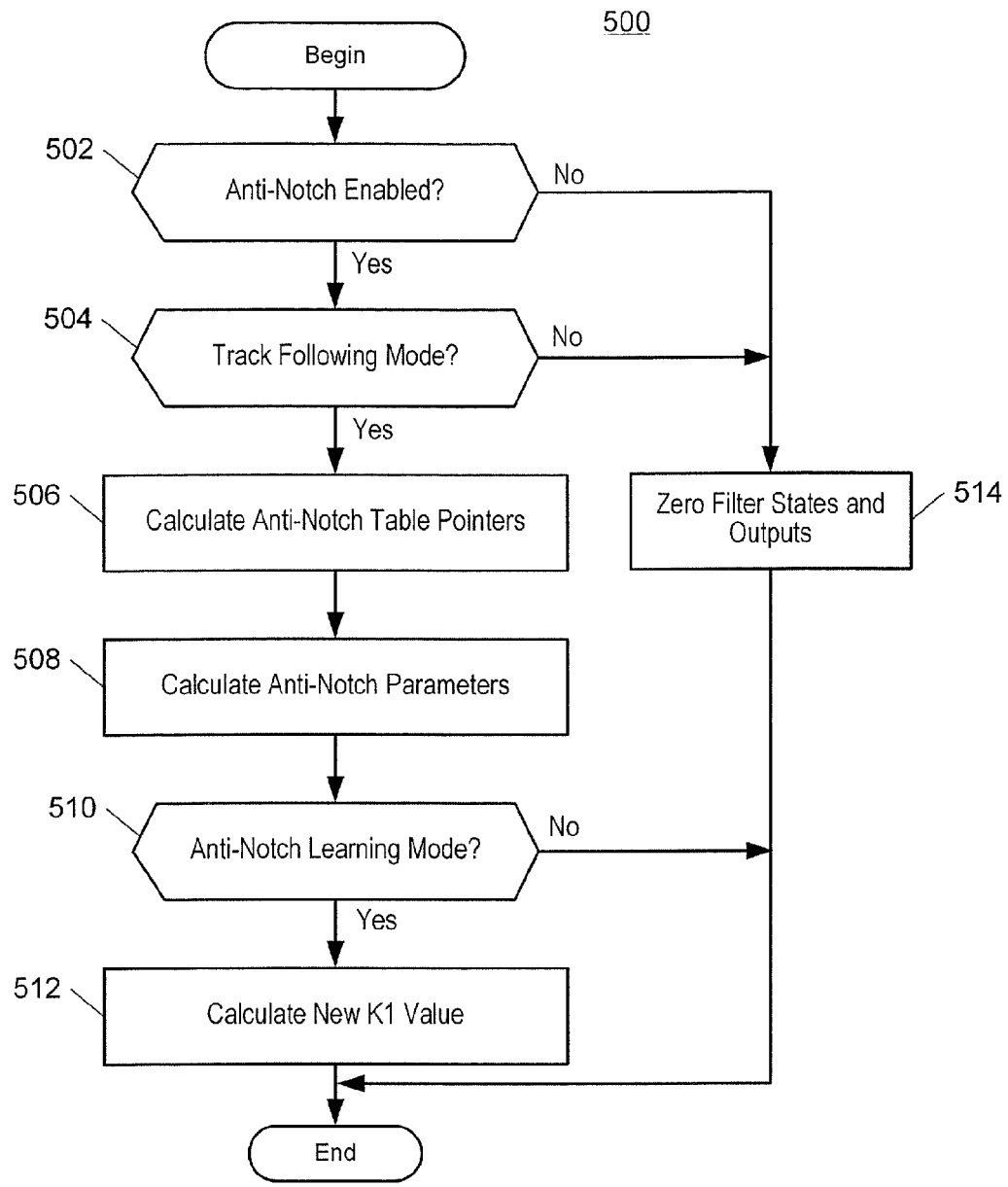
FIG. 6 is a flow chart of operations for tuning a plurality of notch frequencies of the notch filter of FIG. 4 toward different ones of a plurality of resonant frequencies of a NRRO component of the position error signal in accordance with some embodiments.

FIG. 6 is a flow chart of operations 500 that may be carried out by the servo controller 104 of FIG. 1 to tune a plurality of notch frequencies of the notch filter of FIG. 4 toward different ones of a plurality of resonant frequencies of the NRRO component of the PES in accordance with some embodiments. Referring to FIG. 6, at block 502, a decision is made as to whether anti-notch filtering by the phase locked anti-notch loop 220 is enabled and, if so, a further decision is made at block 504 whether the servo control loop 200 is in a track following mode. When servo control loop 200 is in a track following mode, then at block 506, pointers within a table of anti-notch parameters are calculated in response to which one of a plurality of cyclically occurring order time samples has been obtained from the PES.

For example as described above, when the high-Q low pass filter has four notch frequencies, the operations of block 506 sequentially changes the pointer to be directed within the table to a different group of anti-notch parameters that corresponds to the present one of the four cyclically occurring order time samples. By way of further example, the pointer is first directed to the first group of parameters corresponding to a first PES sample slot, the pointer is then directed to a second group of parameters corresponding to a second PES sample slot, the pointer is then directed to a third group of parameters corresponding to a third PES sample slot, and then the pointer is then directed to a fourth group of parameters corresponding to a fourth PES sample slot. The pointer is then cycled back to be sequentially directed to the first, second, third, and fourth groups of parameters in response to respective first through fourth PES sample slots in a next cycle of the PES samples.

It is not necessary at block 506 for there to be a one-to-one mapping between each of the notches and each of the cyclically occurring PES sample slots. For example, two or more notches can be tuned during the first PES sample slot, then another two or more notches can be tuned during the second PES sample slot, and so on. The number of notches that are tuned during a particular one of the PES sample slots can be defined based on the processing throughput that is available for tuning those notch frequencies during the time duration associated with individual ones of the PES sample slots. Increasing the number of notches that are tuned during a particular one of the PES sample slots increases the associated processing overhead of the servo controller 104 that is dedicated to tuning the notches.

At block 508, the filter states for the phase locked anti-notch loop 220 are configured in response to the group of parameters in the table that is referenced by the pointer determined at block 506. At block 510, a decision is made as to whether the phase locked anti-notch loop 220 is in a learning mode. For example, the phase locked anti-notch loop 220 can be determined to be in a learning mode when the servo control loop 200 is in a track following mode and, conversely, can be determined to not be in a learning mode when the servo control loop 200 is in a seek mode, or when the servo control loop 200 is in a track following mode but carrying out a self test procedure that includes introducing self test excitations into the servo control loop 200. When the phase locked anti-notch loop 220 is in a learning mode, then the gain K1 (418) is calculated at block 512 as described above with regard to FIG. 4.

When anti-notch filtering by the phase locked anti-notch loop 220 is not enabled (determined at Block 502) or the servo control loop 200 is not in a track following mode (determined at block 504), then at block 514 the filter states for the phase locked anti-notch loop 420 can be set to zero and the associated gain boosted notched signal 442 and the phase boosted notched signal 446 can each be set to zero.

Figure 7:
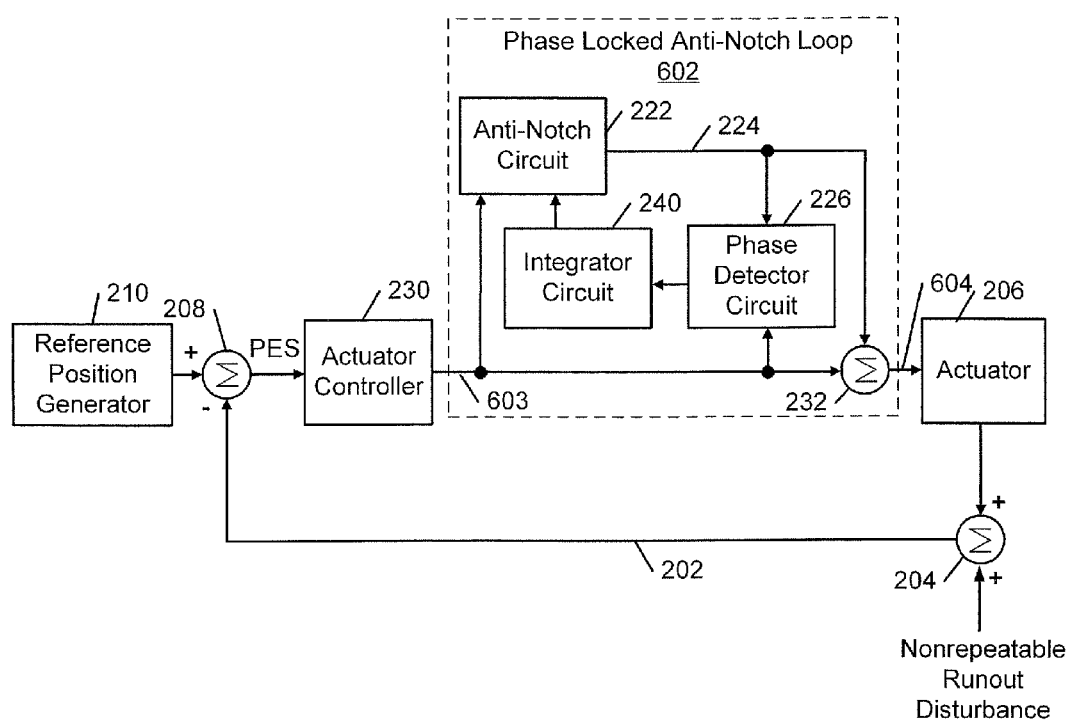
FIG. 7 is a further block diagram of an alternate embodiment of the phase locked anti-notch loop of FIG. 2.

FIG. 7 is a further block diagram of an alternate embodiment of the phase locked anti-notch loop of FIG. 2. The block diagram of FIG. 7 primarily differs from the block diagram of FIG. 2 by the relative location of the phase locked anti-notch loop within the servo control loop. Referring to FIG. 7, a phase locked anti-notch loop 602 filters an actuator control signal 603 that is output from the actuator controller 230 in order to generate a compensated actuator control signal 604 that is passed to the actuator 206. Accordingly, the phase locked anti-notch loop 602 at least partially cancels NRRO in the actuator control signal 603 to generate the compensated actuator control signal 604. The actuator 206 therefore moves responsive to the compensated actuator control signal 604 having at least partially reduced NRRO.

The phase locked anti-notch loop 602 can contain the same components that have been described above for the phase locked anti-notch loop 220 of FIG. 2, however, with the exception that as shown, the components of the phase locked anti-notch loop 602 are adapted to at least partially cancel NRRO in the actuator control signal 603. The phase locked anti-notch loop 602 can be similarly configured to operate as described above for the phase locked anti-notch loop 220 shown in FIG. 4, the further description of which is omitted for brevity. Configuring the phase locked anti-notch loop 602 to filter the actuator control signal 603 as shown in FIG. 7 as opposed to the PES as shown in FIG. 2 may increase the stability of the anti-notch loop 602 when the PES is subjected to a relatively high level of noise (e.g., which may be properly rejected or compensated for by the actuator controller 230).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:
an anti-notch filter that filters a servo control loop signal to generate a filtered signal, the anti-notch filter having a notch frequency that is tuned in response to phase differences between the servo loop control signal and the filtered signal.

2. The circuit of claim 1, wherein the anti-notch filter operates with a plurality of notch frequencies, each of which is tuned toward a different one of a plurality of resonant frequencies of the nonrepeatable runout component of the servo control loop signal.

3. The circuit of claim 2, wherein each of the notch frequencies is repetitively tuned in response to a different one of a plurality of cyclically occurring ordered time samples of the servo control loop signal.

4. The circuit of claim 1, further comprising:
a phase detector circuit that generates a phase error signal in response to multiplication of the servo control loop signal and the filtered signal, wherein the notch frequency of the anti-notch filter is tuned in response to the phase error signal.

5. The circuit of claim 4, wherein:
the anti-notch filter comprises a high-Q low pass filter, with an underdamped gain response, that filters the servo control loop signal to generate a high-Q low pass filtered signal; and
the phase detector circuit generates the phase error signal in response to multiplication of the servo control loop signal and the high-Q low pass filtered signal.

6. The circuit of claim 1, wherein an anti-notch filtered output of the anti-notch filter is combined with the servo control loop signal to generate a phase boosted and gain boosted anti-notch filtered servo control loop signal that at least partially compensates for the nonrepeatable runout component of the servo control loop signal.

7. The circuit of claim 6, wherein the anti-notch filter is configured to respond to detection of frequency content of the nonrepeatable runout component of the servo control loop signal that is above a first threshold value by increasing an amount of gain boosted anti-notch filtering relative to phase boosted anti-notch filtering in the phase-boosted and gain boosted anti-notch filtered servo control loop signal.

8. The circuit of claim 6, wherein the anti-notch filter is configured to respond to detection of frequency content of the nonrepeatable runout component of the servo control loop signal that is below the first threshold value by increasing an amount of phase boosted anti-notch filtering relative to gain boosted anti-notch filtering in the phase-boosted and gain boosted anti-notch filtered servo control loop signal.

9. The circuit of claim 6, wherein the anti-notch filter comprises first and second time delay circuits and first and second gain adjustment circuits having controllable gains, and wherein:
feedback signals are subtracted from the servo control signal to generate a combined signal;
the first time delay circuit delays the combined signal to generate a first delayed signal;
the second time delay circuit further delays the first delayed signal to generate a second delayed signal;
the first gain adjustment circuit has a controllable gain that is applied to scale the first delayed signal;
the second gain adjustment circuit has a controllable gain that is applied to scale the second delayed signal;
the feedback signal comprises the scaled first and second delayed signals from the first and second gain adjustment circuits; and the gain of the first and second gain adjustment circuits are controlled in response to frequency of the nonrepeatable runout component of the servo control loop signal to control location of transfer function response poles for the anti-notch filter.

10. The circuit of claim 6, wherein the anti-notch filter further comprises first and second time delay circuits and first, second, third, and fourth gain adjustment circuits having controllable gains, and first and second combiner circuits, and wherein:
feedback signals are subtracted from the servo control signal to generate a combined signal;
the first time delay circuit delays the combined signal to generate a first delayed signal;
the second time delay circuit further delays the first delayed signal to generate a second delayed signal;
the first gain adjustment circuit has a controllable gain that is applied to scale the first delayed signal;
the second gain adjustment circuit has a controllable gain that is applied to scale the second delayed signal;
the feedback signal comprises the scaled first and second delayed signals from the first and second gain adjustment circuits;
the third gain adjustment circuit has a controllable gain that is applied to scale the first delayed signal;
the fourth gain adjustment circuit has a controllable gain that is applied to scale the second delayed signal;
the first combiner circuit adds the scaled second delayed signal from the fourth gain adjustment circuit and the scaled first delayed signal from the third gain adjustment circuit to generate the anti-notch filtered output of the anti-notch filter; and
the second combiner circuit combines the anti-notch filtered output with the servo control loop signal to generate the phase-boosted and gain boosted anti-notch filtered servo control loop signal.

11. The circuit of claim 10, wherein the anti-notch filter is configured to control at least one of the gains of the first, second, third, and fourth gain adjustment circuits in response to frequency of the nonrepeatable runout component of the servo control loop signal to control an amount of phase boosted anti-notch filtering relative to gain boosted anti-notch filtering in the phase-boosted and gain boosted anti-notch filtered servo control loop signal.

12. The circuit of claim 6, further comprising a servo actuator controller that responds to the phase boosted and gain boosted anti-notch filtered servo control loop signal to generate an actuator control signal to control movement of an actuator, wherein the servo control loop signal is generated as a position error signal between a sensed position and a desired position of the actuator.

13. The circuit of claim 6, further comprising:
an actuator that moves in response to the phase boosted and gain boosted anti-notch filtered servo control loop signal; and
a servo actuator controller that generates the servo control loop signal in response to a position error signal between a sensed position and a desired position of an actuator.

14. A method comprising:
filtering a servo control loop signal using an anti-notch filter to generate a filtered signal; and
tuning a notch frequency of the anti-notch filter in response to phase differences between the servo loop control signal and the filtered signal.

15. The method of claim 14, further comprising tuning each of a plurality of notch frequencies of the filtering toward a different one of a plurality of resonant frequencies of the nonrepeatable runout component of the servo control loop signal.

16. The method of claim 15, further comprising repetitively tuning each of the plurality of notch frequencies in response to a different one of a plurality of cyclically occurring ordered time samples of the servo control loop signal.

17. The method of claim 14, further comprising generating a phase error signal in response to multiplication of the servo control loop signal and the filtered signal, wherein the notch frequency is tuned in response to the phase error signal.

18. The method of claim 14, further comprising:
combining an anti-notch filtered output of the anti-notch filter with the servo control loop signal to generate a phase boosted and gain boosted anti-notch filtered servo control loop signal that at least partially compensates for the nonrepeatable runout component of the servo control loop signal;
increasing an amount of gain boosted anti-notch filtering relative to phase boosted anti-notch filtering in the phase-boosted and gain boosted anti-notch filtered servo control loop signal in response to detection of frequency content of the nonrepeatable runout component of the servo control loop signal that is above a first threshold value; and
increasing an amount of phase boosted anti-notch filtering relative to gain boosted anti-notch filtering in the phase-boosted and gain boosted anti-notch filtered servo control loop signal in response to detection of frequency content of the nonrepeatable runout component of the servo control loop signal that is below the first threshold value.

19. The method of claim 14, wherein the anti-notch filter comprises first and second time delay circuits and first and second gain adjustment circuits having controllable gains, and wherein filtering a nonrepeatable runout component of a servo control loop signal comprises:
subtracting feedback signals from the servo control signal to generate a combined signal;
delaying the combined signal a unit delay to generate a first delayed signal;
delaying the first delayed signal another unit delay to generate a second delayed signal;
scaling the first delayed signal using the controllable gain of the first gain adjustment circuit;
scaling the second delayed signal using the controllable gain of the second gain adjustment circuit, wherein the feedback signal comprises the scaled first and second delayed signals from the first and second gain adjustment circuits; and
controlling the gain of the first and second gain adjustment circuits in response to frequency of the nonrepeatable runout component of the servo control loop signal to control location of transfer function response poles for the anti-notch filter.

20. A servo controller comprising:
a high-Q anti-notch filter having an underdamped gain response, the high-Q anti-notch filter filters a servo control loop signal to generate a filtered signal;
a phase detector circuit that generates a phase error signal in response to multiplication of the servo control loop signal and the filtered signal, wherein a notch frequency of the notch filter is tuned in response to the phase error signal which corresponds to a resonant frequency of a nonrepeatable runout component of the servo control loop signal; and
an actuator controller that controls positioning of a transducer in response to the filtered signal.

* * * * *